US012803372B2

(12) United States Patent
Ramsey et al.

(10) Patent No.: US 12,803,372 B2
(45) Date of Patent: Nov. 17, 2026

(54) EMOTOR BUSBAR VIBRATION REDUCTION MECHANISM

(71) Applicant: Schaeffler Technologies AG & Co. KG, Herzogenaurach (DE)

(72) Inventors: John Ramsey, Mansfield, OH (US); Vishal Jadhav, Kent, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 204 days.

(21) Appl. No.: 18/753,194

(22) Filed: Jun. 25, 2024

(65) Prior Publication Data

US 2025/0392189 A1 Dec. 25, 2025

(51) Int. Cl.
*H02K 5/24* (2006.01)
*H02K 3/50* (2006.01)

(52) U.S. Cl.
CPC ................. *H02K 5/24* (2013.01); *H02K 3/50* (2013.01); *H02K 2203/09* (2013.01)

(58) Field of Classification Search
CPC ......... H02K 5/24; H02K 3/50; H02K 2203/09
See application file for complete search history.

(56) References Cited

U.S. PATENT DOCUMENTS

| | | | |
|---|---|---|---|
| 2020/0251949 A1 | 8/2020 | Onishi et al. | |
| 2021/0050760 A1 | 2/2021 | Yamaguchi et al. | |
| 2022/0200387 A1 | 6/2022 | Yang et al. | |
| 2024/0204586 A1 | 6/2024 | Tess et al. | |

FOREIGN PATENT DOCUMENTS

| | | | |
|---|---|---|---|
| CN | 209642420 | * 11/2019 | ............... H02K 3/50 |
| CN | 112242762 | * 1/2021 | ............... H02K 3/50 |

* cited by examiner

*Primary Examiner* — Terrance L Kenerly
(74) *Attorney, Agent, or Firm* — Price Heneveld LLP

(57) ABSTRACT

A system for connecting a stator assembly to an electric motor includes a housing of the electric motor defining one of an opening or a projection. A plurality of windings is located within the housing. At least one bus bar is in conductive communication with the plurality of windings. A bus carrier supports the at least one bus bar. The bus carrier defines the other of the opening or the projection, and the projection extends into the opening. A bonding medium is in the opening and in contact with the projection and a surface defining the opening to adhere the projection within the opening.

17 Claims, 6 Drawing Sheets

EMOTOR BUSBAR VIBRATION REDUCTION MECHANISM

FIELD OF THE DISCLOSURE

The present disclosure generally relates to a system for connecting a stator assembly to an electric motor, and, more particularly, a mounting system for connecting a bus bar carrier to a housing of the electric motor that reduces relative movement therebetween.

BACKGROUND OF THE DISCLOSURE

Electric motors typically include a housing with a rotor and a stator located in the housing. The stator typically includes a bus bar and, during usage, relative movements, such as vibration, can cause the bus bar to become dislodged or loose within the housing.

SUMMARY OF THE DISCLOSURE

According to a first aspect of the present disclosure, a system for connecting a stator assembly to an electric motor includes a housing of the electric motor defining one of an opening or a projection. A plurality of windings is located within the housing. At least one bus bar is in conductive communication with the plurality of windings. A bus carrier supports the at least one bus bar. The bus carrier defines the other of the opening or the projection, and the projection extends into the opening. A bonding medium is in the opening and in contact with the projection and a surface defining the opening to adhere the projection within the opening.

Embodiments of the first aspect of the disclosure can include any one or a combination of the following features:

- the bus carrier defines the projection and the housing defines the opening;
- the opening is defined by an at least one rib extending from an interior surface of the housing;
- the at least one rib is integrally formed with the housing;
- the bus carrier defines the opening and the housing defines the projection;
- the projection includes an elongated body defining a length and a height, the length being greater than the height;
- the projection includes at least one post;
- the at least one post defines a width and a height, the height being greater than the width;
- the at least one post defines two or more posts and the opening includes two or more openings, each of the two or more posts located in a different one of the two or more openings; and
- the opening includes an undercut.

According to a second aspect of the present disclosure, a system for connecting a stator assembly to an electric motor includes a housing of the electric motor defining one of an opening or a projection. A plurality of windings is located within the housing. At least one bus bar is in conductive communication with the plurality of windings. A bus carrier supports the at least one bus bar. The bus carrier defines the other of the opening or the projection, and the projection extends into the opening. A bonding medium formed of a resin is in the opening and in contact with the projection and a surface defining the opening to adhere the projection within the opening.

Embodiments of the second aspect of the disclosure can include any one or a combination of the following features:

- the bus carrier is formed of a non-conductive material and the housing is formed of a metal material;
- the bus carrier defines the projection and the housing defines the opening;
- the bus carrier defines the opening and the housing defines the projection; and
- the non-conductive material is a plastic.

According to a third aspect of the present disclosure, a system for connecting a stator assembly to an electric motor includes a housing of the electric motor. A fixation bracket is non-integral with and connected to the housing, the fixation bracket defines an opening. A plurality of windings is located within the housing. At least one bus bar is in conductive communication with the plurality of windings. A bus carrier supports the at least one bus bar. The bus carrier extends into the opening. A bonding medium formed is in the opening and in contact with the bus carrier and a surface defining the opening to adhere the bus carrier within the opening.

Embodiments of the third aspect of the disclosure can include any one or a combination of the following features:

- the fixation bracket includes a cup portion defining the opening;
- the fixation bracket further includes a tab portion defining an aperture and a fastener extends through the aperture and is coupled to the housing;
- the at least one bus bar is at least partially located in the opening; and
- the housing defines a pocket and the fixation bracket is at least partially located in the pocket.

These and other features, advantages, and objects of the present disclosure will be further understood and appreciated by those skilled in the art by reference to the following specification, claims, and appended drawings.

Figure 1:
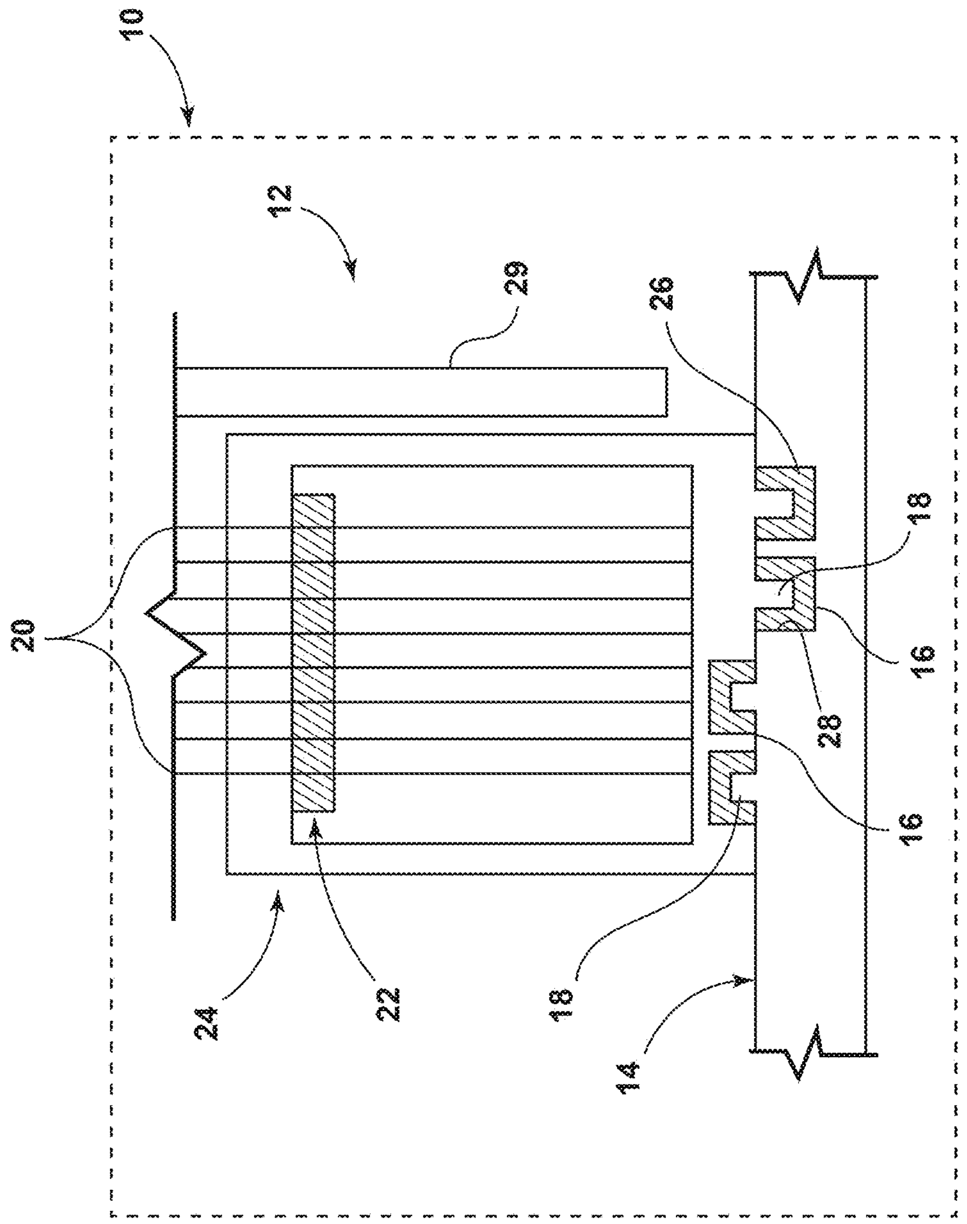
FIG. 1 is a schematic view of an electric motor having a housing with a stator assembly and a bus bar located within the housing.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis.

As used herein, the term "opening" is defined as a space that accommodates one or more projections for the purpose of securing a bus bar to a housing. The opening may be a blind hole, a through hole, or a combination of through and blind holes. Further, as used herein, when a projection extends into an opening, the projection may extend partially or fully into the opening. The projection may contact a surface defining the opening (e.g., a sidewall or a floor) or may be suspended within the opening.

Referring now to FIG. 1, reference numeral 10 generally designates an electric motor and a system of connecting the electric motor 10 to various internal components. More particularly, the electric motor 10 includes a stator assembly 12 and a rotor (not shown). The electric motor 10 includes a housing 14 of a first construction defining one of an opening 16 or a projection 18. A plurality of windings 20 is located within the housing 14. At least one bus bar 22 is in conductive communication with the plurality of windings 20. In various implementations, the at least one bus bar 22 is fixed to certain windings 20 via, for example, welding. A bus carrier 24 (e.g., an overmolding) is coupled to and supports the at least one bus bar 22. The bus carrier 24 defines the other of the opening 16 or the projection 18, and the projection 18 extends into the opening 16. A bonding medium 26 is in the opening 16 and in contact with the projection 18 and a surface 28 defining the opening 16 to adhere the projection 18 within the opening 16.

With continued reference to FIG. 1, the opening 16 may be defined by the housing 14, the bus carrier 24, or a combination of both the housing 14 and the bus carrier 24. In a similar manner, the projection 18 may be defined by the housing 14, the bus carrier 24, or a combination of both the housing 14 and the bus carrier 24. In some embodiments, the housing 14 may define a plurality of the projections 18 (e.g., two or more) and/or a plurality of the openings 16 (e.g., two or more). In such embodiments, the bus carrier 24 may define openings 16 in equal number to the projections 18 defined by the housing 14 and/or projections 18 in equal number to the openings 16 defined by the housing 14. While specific constructions of the opening 16 and projection 18 are described and illustrated in the proceeding paragraphs and drawings, it should be appreciated that, unless otherwise explicitly stated, the number, shape, and location of the openings 16 and projections 18 may vary without departing from the scope of the subject disclosure. Likewise, it should be appreciated that, unless explicitly stated, the electric motor 10 may be incorporated into any structure (e.g., an electric axle or other components of a vehicle) and/or utilized for any function where it is beneficial to reduce relative movement (e.g., vibration) and/or secure the connection between the bus bar 22 and the housing 14. As depicted, the opening 16 may be a blind opening within the housing 14 to cup and retain the bonding medium 26.

With continued reference to FIG. 1, the bonding medium 26 may be formed of a curable adhesive material, such as a single-part resin, a two-part resin (e.g., an epoxy), a UV curable resin, and/or a chemical curing resin. The at least one bus bar 22 may include a plurality of bus bars 22 stacked and in interdigitated conductive communication with select ones of the plurality of windings 20. In this manner, the bus carrier 24 may be configured to connect to multiple bus bars 22 and space each bus bar 22 (e.g., conductively isolate) from one another. The bus carrier 24 may be formed of a non-conductive material, such as a plastic. The housing 14 may be formed of metal material, such as an aluminum, steel, or other metal material that may be cast formed. The stator assembly 12 may include a stator carrier 29 that that mounts to the housing 14. The stator carrier 29 may locate and be connected to the plurality of windings 20, the at least one bus bar 22, and the bus carrier 24. In some embodiments, the stator carrier 29 may connected to the housing 14 at other locations in addition to the bus carrier 24.

Figure 2:
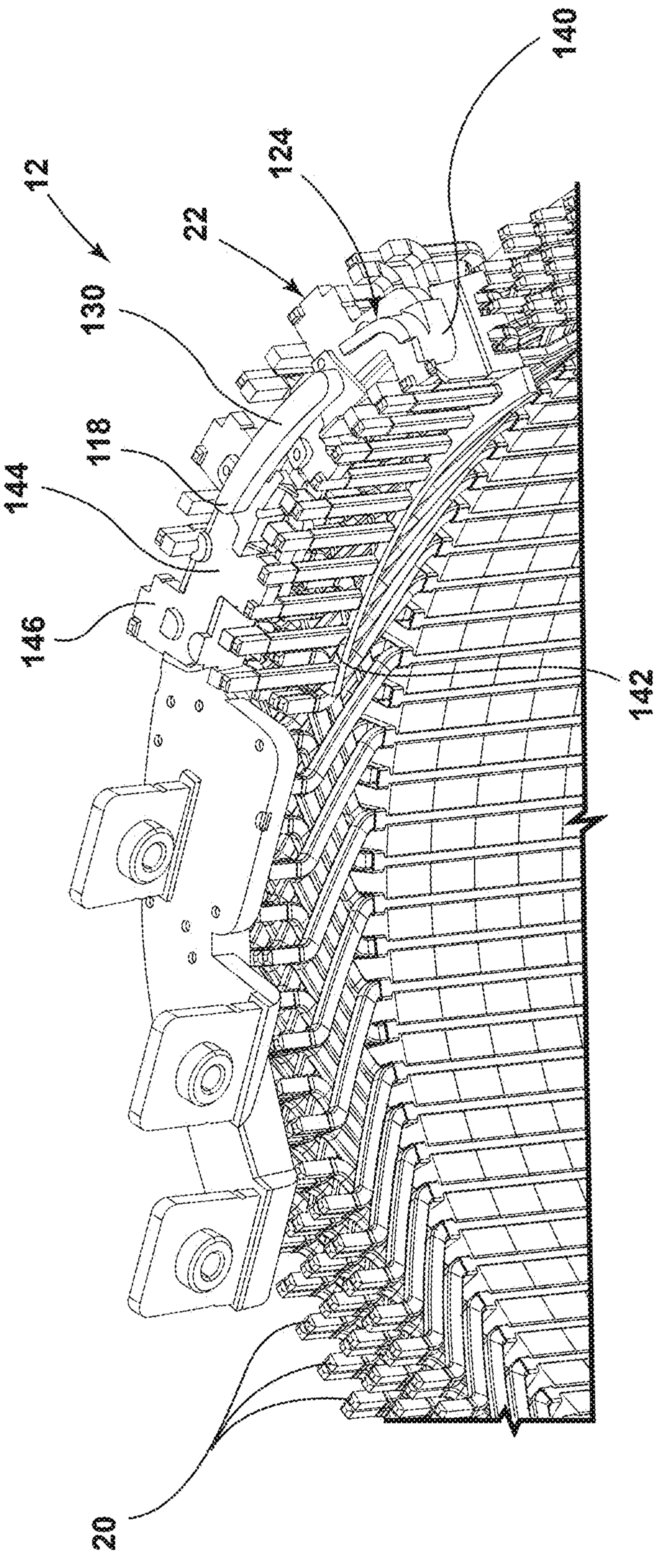
FIG. 2 is a lower perspective view of a bus carrier that locates a bus bar relative to windings of an electric motor.
Figure 3:
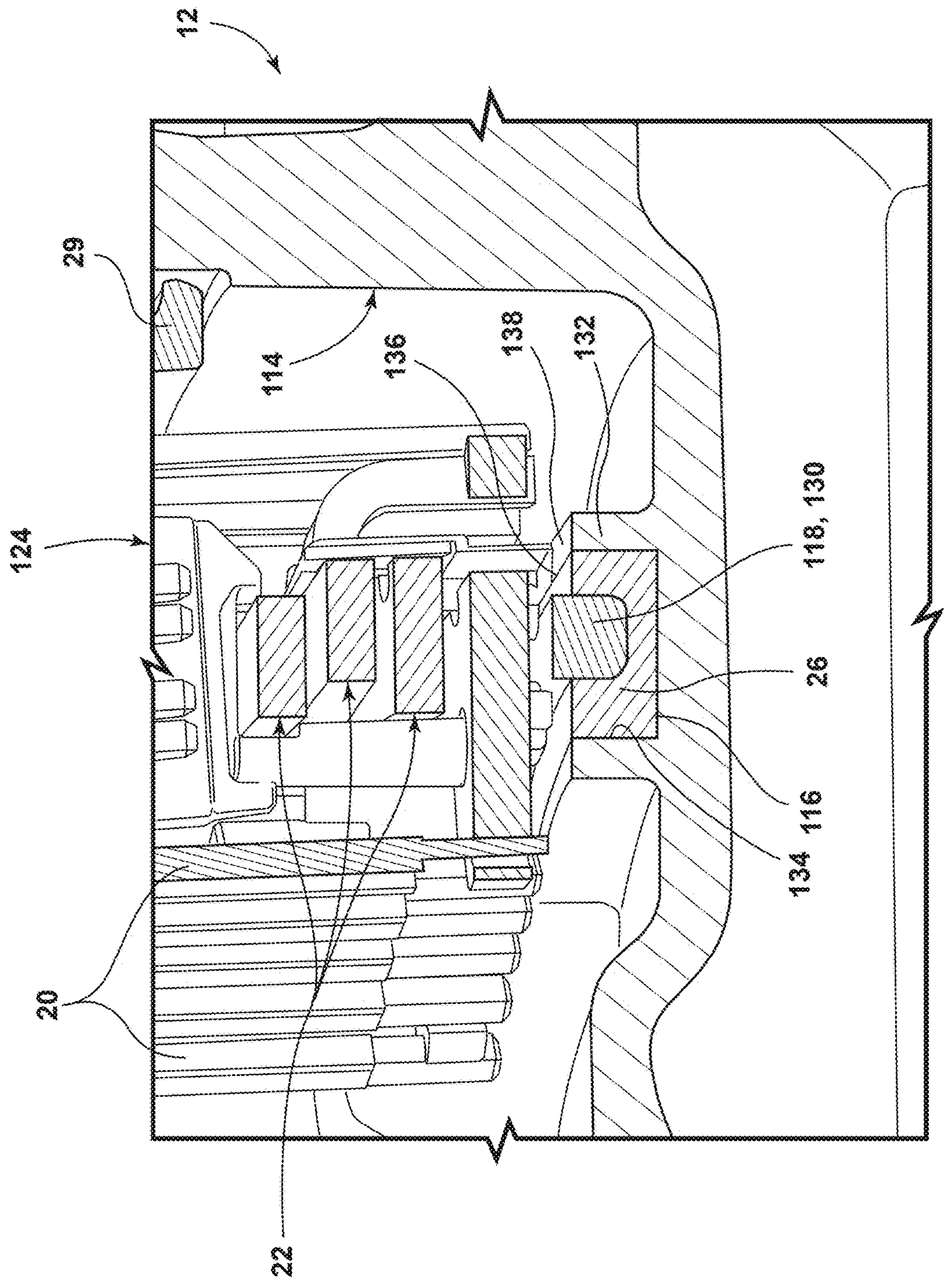
FIG. 3 is a cross-sectional view of a bus carrier that locates a bus bar relative to windings of an electric motor, the bus carrier includes a projection with an elongated body that is bonded to a housing of the electric motor.

With reference now to FIGS. 2 and 3, the stator assembly 12 is depicted within a housing 114 of the electric motor 10 and includes a bus carrier 124 of a second construction. The electric motor 10 may include all the same features, elements, materials, number of elements (e.g., projections and openings), element locations, and arrangements of the other constructions described herein. However, the bus carrier 124 and/or the housing 114 includes at least one projection 118 (i.e., a single or multiple) having an elongated body 130 and the other of the bus carrier 124 and the housing 114 defines an at least one opening 116 (i.e., a single or multiple) that substantially matches, but is slightly larger than, the shape of the elongated body 130. More particularly, the elongated body 130 defines a length "L" and a height "H," the length L is greater than the height H. As depicted, the opening 116 may be defined by an at least one rib 132 that extends from an interior surface 134 of the housing 114. In some embodiments, the at least one rib 132 is integral with the housing 114 (e.g., casted or otherwise formed with the housing 114). Similarly, the projection 118 may be formed by the bus carrier 124. The bus carrier 124 may define at least one interface surface 136 that contacts an upper edge 138 and/or a side of the at least one rib 132. The interface surface 136 abuts the at least one rib 132 to assist in preventing relative movement between the projection 118 and the opening 116 in addition to setting a relative position between the projection 118 and the opening 116 as the bonding medium 26 cures. As depicted, the opening 116 defines a depth "D" that is greater than the height H of the elongated body 130 and the opening 116 further defines a lateral spacing "S" that is greater than a width "W" of the elongated body 130. In this manner, the projection 118 may be suspended within the opening 116 and held in place by the bonding medium 26 and the interface surface 136. The at least one rib 132 may define a closed loop, such that the opening 116 forms a channel shaped space that can retain the bonding medium 26 without any spillage. However, in other embodiments, the at least one rib 132 may include two or more ribs 132 that are or are not completely closed loop. As depicted, the opening 116 may be a blind opening within the housing 114 to cup and retain the bonding medium 26.

With continued reference to FIGS. 2 and 3, but applicable to each of the constructions described herein, the bus carrier 124 may have a multi-piece or single-piece construction. The bus carrier 124 may be shaped to support multiple bus bars 22. The bus carrier 124 includes a body 140 defining multiple holes 142 that the windings 20 can be inserted into. The bus bars 22 include a main body portion 144 and tabs 146 extending into conductive communication with select windings 20. In some embodiments, each of the plurality of bus bars 22 is in conductive communication with different ones of the windings 20. The windings 20, the bus bars 22, and the bus carrier 124 may be connected to the stator carrier 29. When the projection 118 is defined by the bus carrier 124, the projection 118 may extend from the body 140 in a direction towards the housing 114. The stator assembly 12 and rotor (not shown) may extend along a common axis that the rotor rotates about in operation. In some embodiments, the projection 118 (e.g., the height H) may extend along the axis. However, it should be appreciated that the projection 118 (e.g., the height) may extend perpendicular to the axis.

Figure 4:
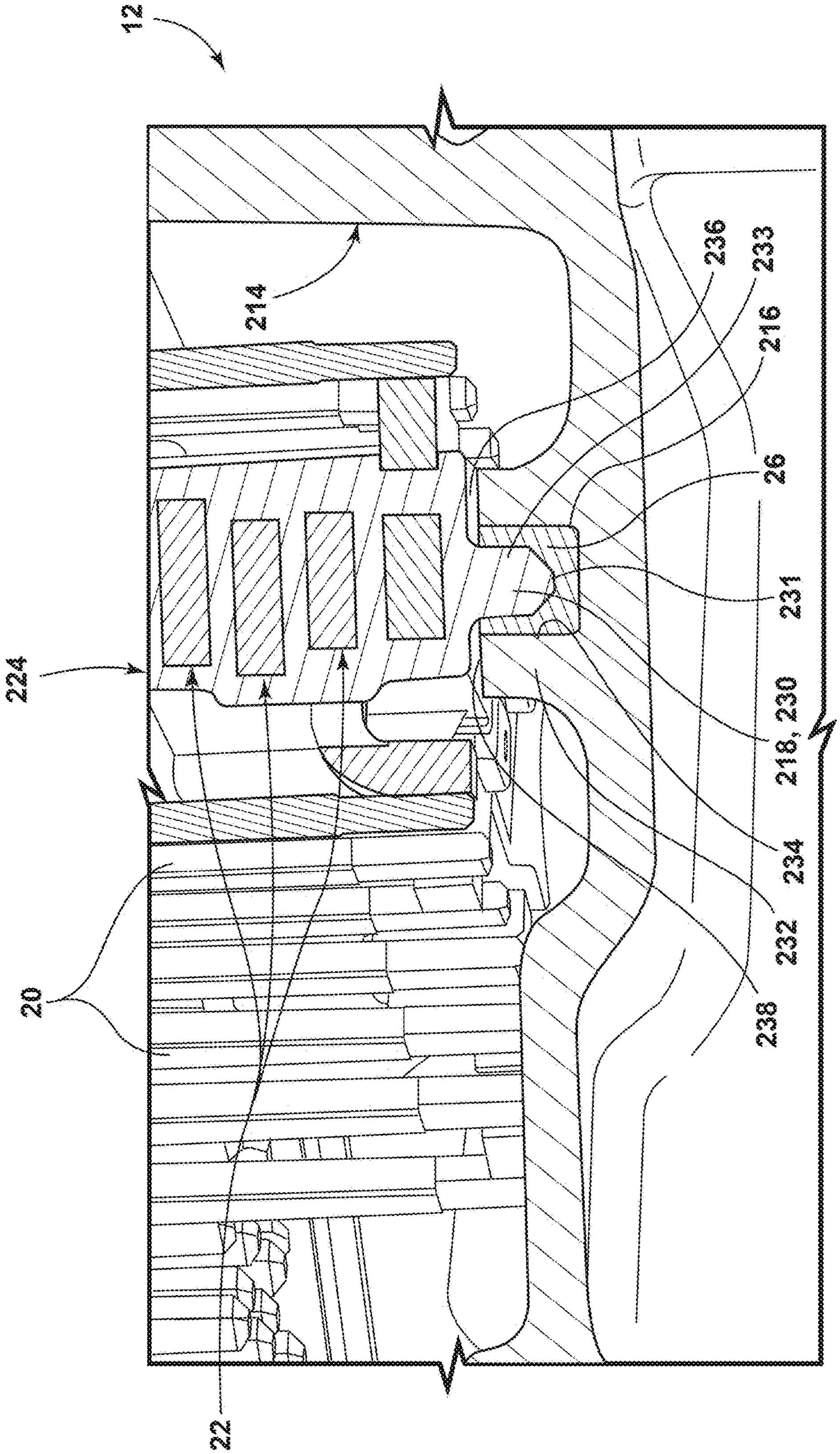
FIG. 4 is a cross-sectional view of a bus carrier that locates a bus bar relative to windings of an electric motor, the bus carrier includes a projection defining a post that is bonded to a housing of the electric motor.

With reference now to FIG. 4, the stator assembly 12 is depicted within a housing 214 of the electric motor 10 and a bus carrier 224 of a third construction. The electric motor 10 may include all the same features, elements, materials, number of elements (e.g., projections and openings), element locations, and arrangements of the other constructions described herein. However, the bus carrier 224 and/or the housing 214 includes at least one projection 218 (i.e., a single or multiple) that includes a post 230 and the other of the bus carrier 224 and the housing 214 defines an at least one opening 216 (i.e., a single or multiple) that substantially matches, but is slightly larger than, the shape of the post 230 or multiple posts 230. More particularly, the opening 216 may be sized to accommodate only a single post 230 or elongated to accommodate two or more posts 230. In some embodiments, each post 230 defines a width "W" and a height "H," with the height H being greater than the width W. In some embodiments, the post 230 extends along the height to an apex 231. The post 230 and/or apex 231 may define a variety of different features to facilitate retention and adherence to the bonding medium 26. For example, the apex 231 may define corrugations, angled flat surfaces, and/or the like. Similarly, a body 233 of the post 230 may define a circular, a square, or a polygonal cross-section and define corrugations, threads, or the like. The body 233 of the post 230 may extend at least part (e.g., a majority of) the height H before the apex 231 begins to merge. As depicted, the opening 216 may be defined by at least one rib 232 that extends from an interior surface 234 of the housing 214. In some embodiments, the at least one rib 232 is integral with the housing 214 (e.g., casted or otherwise formed with the housing 214). Similarly, the projection 218 may be formed by the bus carrier 224. The bus carrier 224 may define at least one interface surface 236 (e.g., a pair of interface surfaces 236) that contacts an upper edge 238 and/or a side of the at least one rib 232. The interface surface 236 abuts the at least one rib 232 to assist in preventing relative movement between the projection 218 and the opening 216 in addition to setting a relative position between the projection 218 and the opening 216 as the bonding medium 26 cures. As depicted, the opening 216 defines a depth "D" that is greater than the height H of the post 230 and the opening 216 further defines a lateral spacing "S" between the at least one rib 216 that is greater than the width W of the post 230. In this manner, the post 230 may be suspended within the opening 216 and held in place by the bonding medium 26 and the interface surface 236. The at least one rib 232 may define a closed loop, such that the opening 216 forms a cylindrically shaped space (e.g., for a single post 230) or a channel shaped space (e.g., for two or more posts 230) that can retain the bonding medium 26 without any spillage. However, in other embodiments, the at least one rib 232 may include two or more ribs 232 that are or are not completely closed loop. As depicted, the opening 216 may be a blind opening within the housing 214 to cup and retain the bonding medium 26. It is contemplated that the bus carrier 224 may include two or more spaced projections 218 (e.g., posts 230) that extend into different openings 216.

Figure 5:
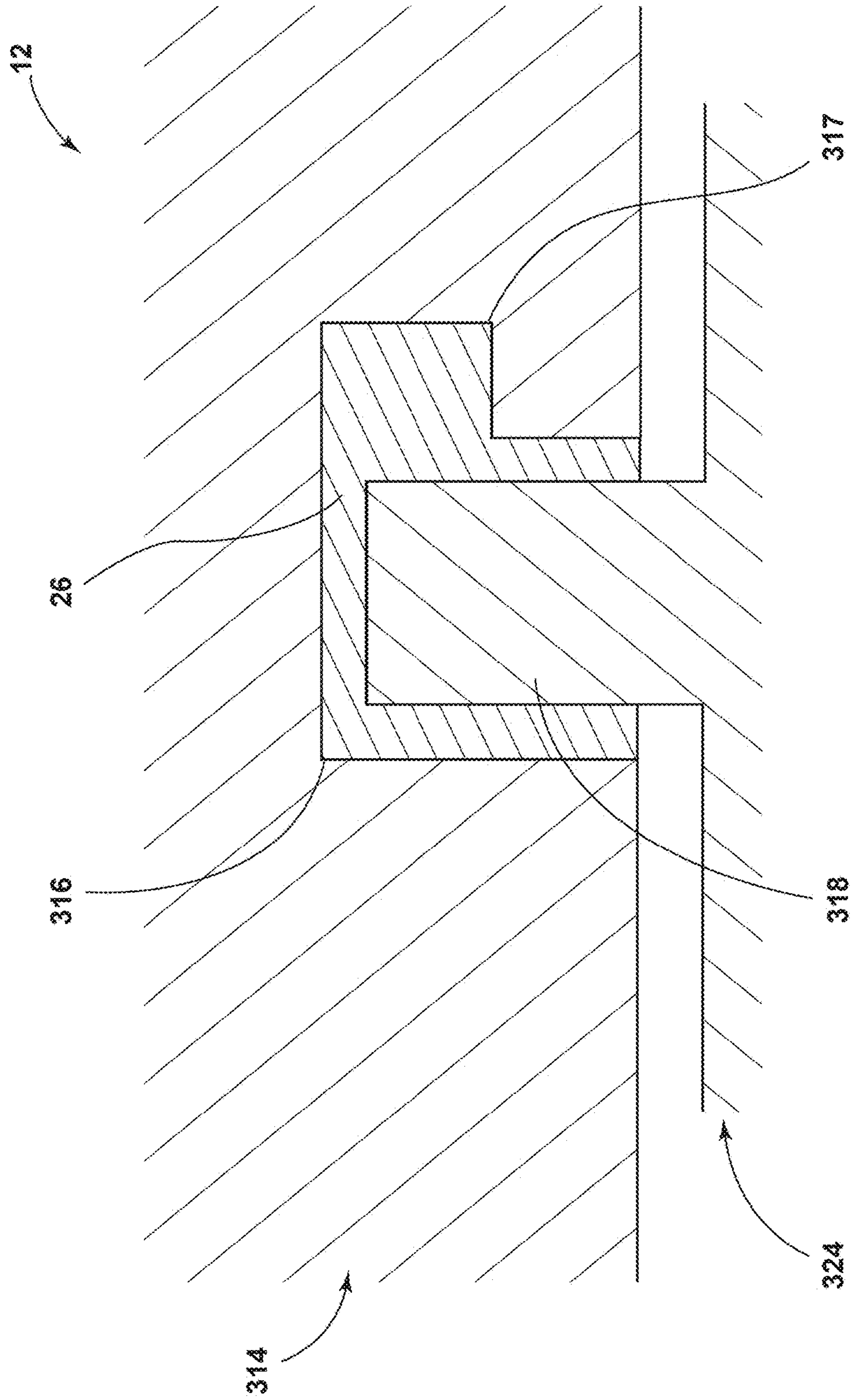
FIG. 5 is a cross-sectional view of a bus carrier that locates a bus bar relative to windings of an electric motor, the bus carrier includes a projection and a housing of the electric motor includes an opening with an undercut.

With reference now to FIG. 5, the stator assembly 12 is depicted with a housing 314 of the electric motor 10 and a bus carrier 324 of a fourth construction. The electric motor may include all the same features, elements, materials, number of elements (e.g., projections and openings), element locations, and arrangements of the other constructions described herein. More particularly, the bus carrier 324 and/or the housing 314 includes at least one projection 318 (i.e., a single or multiple) that may be configured as the projection 18, the elongated body 130, or the post 230 as the previous constructions and the other of the bus carrier 324 and the housing 314 defines an at least one opening 316 (i.e., a single or multiple) that substantially matches, but is slightly larger than, the shape of the projection 318. However, the opening 316 includes an undercut 317 that holds additional bonding medium 26 and allows the bonding medium 26 to be retained in multiple directions for further relative movement prevention. While the undercut 317 is depicted as only extending from one side of the opening 316, it should be appreciated that the undercut 317 may extend around an entire perimeter of the opening 316.

Figure 6:
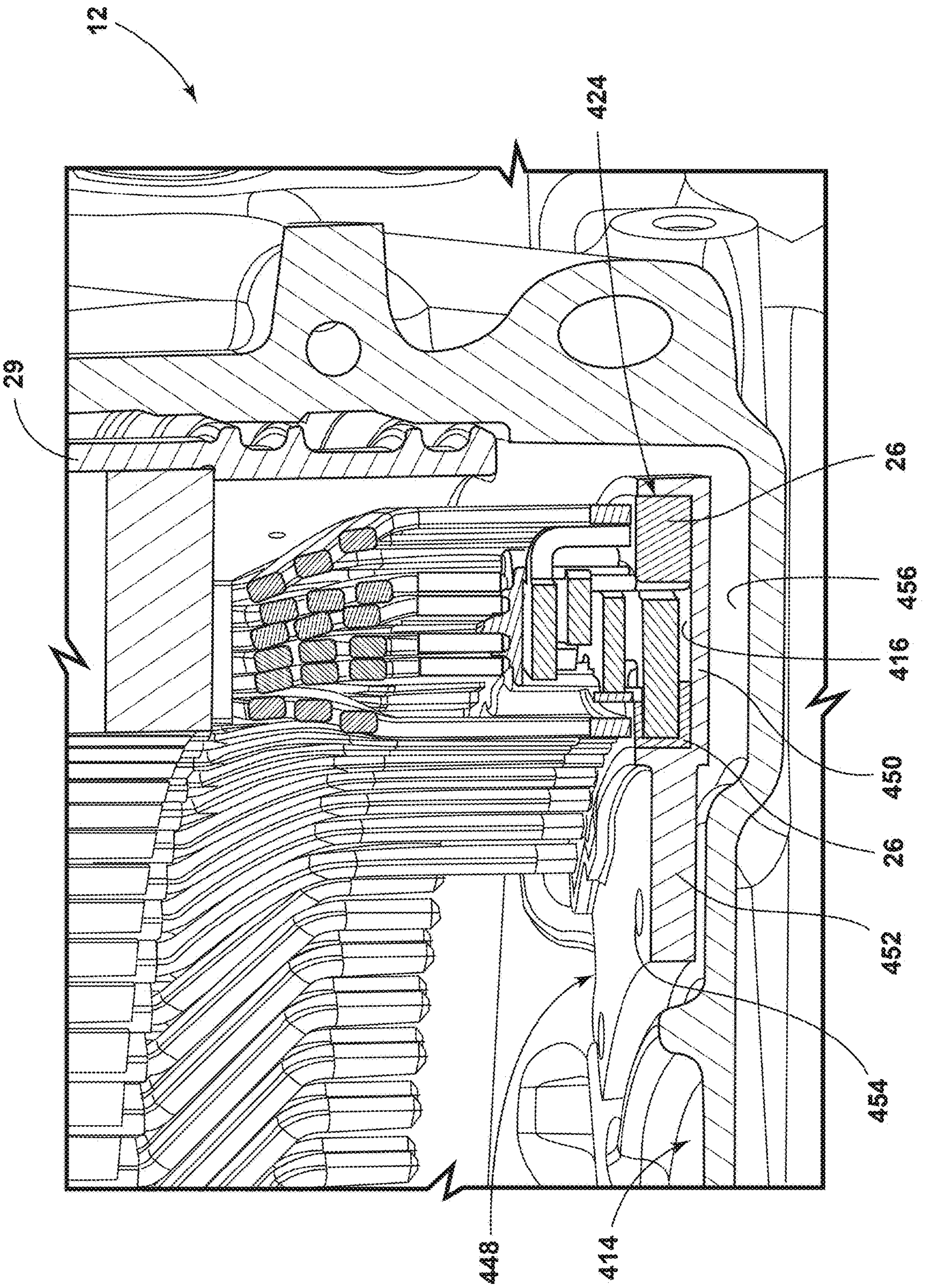
FIG. 6 is a cross-sectional view of a bus carrier that locates a bus bar relative to windings of an electric motor, a fixation bracket is connected to a housing of the electric motor and is bonded to the bus carrier.

With reference now to FIG. 6, the stator assembly 12 is depicted with a housing 414 of the electric motor 10 and a bus carrier 424 of a fifth construction. The electric motor 10 may include all the same features, elements, materials, number of elements (e.g., projections and openings), element locations, and arrangements of the other constructions described herein. However, the housing 414 includes a fixation bracket 448 that is non-integral with and connected to the housing 414. The fixation bracket 448 includes a cup portion 450 that defines an opening 416. As depicted, the opening 416 may be sized to accommodate a bus carrier 424 and the bonding medium 26 without a projection. In this manner, one of the bus bars 22 and some of the windings 20 may be at least partially located in the opening 416. The fixation bracket 448 may further include a tab portion 452 that defines an aperture 454 and a fastener (not shown) extends through the aperture 454 and is coupled to the housing 414 (e.g., within fastener holes in the housing 414). In some embodiments, the cup portion 450 may be stepped from the tab portion 452 and the housing 414 may define a pocket 456 and the fixation bracket 448 is at least partially located in the pocket 456. While the opening 416 is depicted as sized to accommodate a bus carrier 424 and the bonding medium 26 without a projection, it should be appreciated that the cup portion 450 may defining openings 16, 116, 216, and 316 of the other constructions described herein. In this manner, the bus carrier 424 may similarly include a projection 18, 118, 218, and 318 configured to mate with the opening 416.

It is to be understood that variations and modifications can be made on the aforementioned structure without departing from the concepts of the present disclosure, and further it is to be understood that such concepts are intended to be covered by the following claims unless these claims by their language expressly state otherwise.

| List of Reference Numerals | |
|---|---|
| 10 | electric motor |
| 12 | stator assembly |
| 20 | plurality of windings |
| 22 | bus bar |
| 26 | bonding medium |
| 29 | stator carrier |
| First Construction | |
| 14 | housing |
| 16 | opening |
| 18 | projection |
| 24 | bus carrier |
| 28 | surface |
| Second Construction | |
| 114 | housing |
| 116 | opening |
| 118 | projection |
| 124 | bus carrier |
| 130 | elongated body |
| 132 | rib |
| 134 | interior surface |
| 136 | interface surface |
| 138 | upper edge |
| 140 | body |
| 142 | holes |
| 144 | body portion |
| 146 | tabs |
| Third Construction | |
| 214 | housing |
| 216 | opening |
| 218 | projection |
| 224 | bus carrier |
| 230 | post |
| 231 | apex |
| 232 | rib |
| 233 | body |

-continued

| List of Reference Numerals | |
|---|---|
| 234 | interior surface |
| 236 | interface surface |
| 238 | upper edge |
| Fourth Construction | |
| 314 | housing |
| 316 | opening |
| 317 | undercut |
| 318 | projection |
| 324 | bus carrier |
| Fifth Construction | |
| 414 | housing |
| 416 | opening |
| 424 | bus carrier |
| 448 | fixation bracket |
| 450 | cup portion |
| 452 | tab portion |
| 454 | aperture |
| 456 | pocket |

What is claimed is:

1. A system for connecting a stator assembly to an electric motor, comprising:
- a housing of the electric motor defining one of an opening or a projection that includes at least one post;
- a plurality of windings within the housing;
- at least one bus bar in conductive communication with the plurality of windings;
- a bus carrier that supports the at least one bus bar, the bus carrier defining the other of the opening or the projection, wherein the projection extends into the opening; and
- a bonding medium in the opening and in contact with the projection and a surface defining the opening to adhere the projection within the opening.

2. The system of claim 1, wherein the bus carrier defines the projection and the housing defines the opening.

3. The system of claim 2, wherein the opening is defined by an at least one rib extending from an interior surface of the housing.

4. The system of claim 3, wherein the at least one rib is integrally formed with the housing.

5. The system of claim 1, wherein the bus carrier defines the opening and the housing defines the projection.

6. The system of claim 1, wherein the at least one post defines a width and a height, the height being greater than the width.

7. The system of claim 1, wherein the at least one post defines two or more posts and the opening includes two or more openings, each of the two or more posts located in a different one of the two or more openings.

8. The system of claim 1, wherein the opening includes an undercut.

9. A system for connecting a stator assembly to an electric motor, comprising:
- a housing of the electric motor defining one of an opening including an undercut or a projection;
- a plurality of windings within the housing;
- at least one bus bar in conductive communication with the plurality of windings;
- a bus carrier that supports the at least one bus bar, the bus carrier defining the other of the opening or the projection, wherein the projection extends into the opening; and a bonding medium formed of a resin in the opening and in contact with the projection and a surface defining the opening to adhere the projection within the opening.

10. The system of claim 9, wherein the projection includes an elongated body defining a length and a height, the length being greater than the height.

11. The system of claim 9, wherein the bus carrier is formed of a non-conductive material and the housing is formed of a metal material.

12. The system of claim 11, wherein the bus carrier defines the projection and the housing defines the opening.

13. The system of claim 11, wherein the bus carrier defines the opening and the housing defines the projection.

14. The system of claim 11, wherein the non-conductive material is a plastic.

15. A system for connecting a stator assembly to an electric motor, comprising:

a housing of the electric motor;

a fixation bracket non-integral with and connected to the housing, the fixation bracket including a tab portion defining an aperture and a fastener extends through the aperture and is coupled to the housing, the fixation bracket including a cup portion defining an opening;

a plurality of windings within the housing;

at least one bus bar in conductive communication with the plurality of windings;

a bus carrier that supports the at least one bus bar, the bus carrier extends into the opening; and a bonding medium in the opening and in contact with the bus carrier and a surface defining the opening to adhere the bus carrier within the opening.

16. The system of claim 15, wherein the at least one bus bar is at least partially located in the opening.

17. The system of claim 15, wherein the housing defines a pocket and the fixation bracket is at least partially located in the pocket.

* * * * *